United States Patent

Sakabayashi

(10) Patent No.: US 11,069,223 B2
(45) Date of Patent: Jul. 20, 2021

(54) INFORMATION PROCESSING DEVICE, AND INFORMATION PROCESSING SYSTEM

(71) Applicant: SONY CORPORATION, Tokyo (JP)

(72) Inventor: Takayuki Sakabayashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/347,034

(22) PCT Filed: Nov. 7, 2017

(86) PCT No.: PCT/JP2017/040123
§ 371 (c)(1),
(2) Date: May 2, 2019

(87) PCT Pub. No.: WO2018/110151
PCT Pub. Date: Jun. 21, 2018

(65) Prior Publication Data
US 2019/0311605 A1 Oct. 10, 2019

(30) Foreign Application Priority Data
Dec. 16, 2016 (JP) .............. JP2016-244328

(51) Int. Cl.
G08B 29/00 (2006.01)
G08B 25/10 (2006.01)
G08B 25/01 (2006.01)
G08B 25/08 (2006.01)
H04M 11/04 (2006.01)
H04W 4/02 (2018.01)
H04W 84/18 (2009.01)

(52) U.S. Cl.
CPC ............ *G08B 25/10* (2013.01); *G08B 25/016* (2013.01); *G08B 25/08* (2013.01); *H04M 11/04* (2013.01); *H04W 4/02* (2013.01); *H04W 84/18* (2013.01)

(58) Field of Classification Search
CPC ...... G08B 25/10; G08B 25/016; G08B 25/08; H04M 11/04; H04W 4/02; H04W 84/18
See application file for complete search history.

(56) References Cited

U.S. PATENT DOCUMENTS 7,312,712 B1 * 12/2007 Worrall .................. G06Q 10/06
340/573.4
9,679,487 B1 * 6/2017 Hayward ............... G08G 1/162
(Continued)

FOREIGN PATENT DOCUMENTS

JP 2009-301457 A 12/2009
JP 2009301457 A * 12/2009
(Continued)

OTHER PUBLICATIONS

Maryam et al., A Survey on Smartphones Systems for Emergency Management (SPSEM) (Year: 2016).*
(Continued)

Primary Examiner — Quang Pham
(74) Attorney, Agent, or Firm — Chip Law Group

(57) ABSTRACT

Provided is an information processing device including: a processing unit configured to determine whether to make a report on the basis of a detection result of a sensor, and cause report information indicating report contents to be transmitted by broadcasting on the basis of a determination result.

11 Claims, 8 Drawing Sheets

(56) References Cited

U.S. PATENT DOCUMENTS

| | | | | |
|---|---|---|---|---|
| 9,805,601 | B1* | 10/2017 | Fields | G06Q 40/08 |
| 10,726,642 | B1* | 7/2020 | Goluguri | G07C 5/0866 |
| 2004/0166828 | A1* | 8/2004 | Yosioka | G08B 25/016 |
| | | | | 455/344 |
| 2009/0106052 | A1* | 4/2009 | Moldovan | G06Q 20/10 |
| | | | | 705/4 |
| 2011/0153118 | A1* | 6/2011 | Lim | G08B 29/00 |
| | | | | 701/2 |
| 2011/0225096 | A1* | 9/2011 | Cho | G06Q 10/20 |
| | | | | 705/305 |
| 2013/0137372 | A1* | 5/2013 | Nishidai | B60R 25/102 |
| | | | | 455/41.1 |
| 2013/0187792 | A1* | 7/2013 | Egly | G08G 1/162 |
| | | | | 340/901 |
| 2014/0062700 | A1* | 3/2014 | Heine | G06Q 10/08 |
| | | | | 340/572.1 |
| 2014/0081481 | A1* | 3/2014 | Nishida | B60L 50/52 |
| | | | | 701/2 |
| 2015/0342542 | A1* | 12/2015 | An | H04W 76/50 |
| | | | | 455/404.2 |
| 2015/0348337 | A1* | 12/2015 | Choi | G07C 5/008 |
| | | | | 701/31.5 |
| 2016/0086491 | A1* | 3/2016 | Choi | H04M 11/04 |
| | | | | 340/425.5 |
| 2016/0104328 | A1* | 4/2016 | Chen | G07C 5/008 |
| | | | | 701/31.5 |
| 2016/0159279 | A1* | 6/2016 | Mori | G07C 9/00174 |
| | | | | 340/438 |
| 2016/0182170 | A1* | 6/2016 | Daoura | H04W 12/033 |
| | | | | 455/3.01 |
| 2017/0011562 | A1* | 1/2017 | Hodges | G08G 1/096741 |
| 2017/0201619 | A1* | 7/2017 | Cohen | H04W 4/50 |
| 2018/0029553 | A1* | 2/2018 | Hamakami | G08B 25/04 |
| 2018/0197412 | A1* | 7/2018 | Uchiyama | G08G 1/012 |
| 2018/0286511 | A1* | 10/2018 | Sukigara | G16H 20/10 |
| 2019/0272760 | A1* | 9/2019 | Mcquillen | G08G 1/0968 |
| 2019/0311605 | A1* | 10/2019 | Sakabayashi | G08B 25/016 |

FOREIGN PATENT DOCUMENTS

| | | | |
|---|---|---|---|
| JP | 2013-131135 A | | 7/2013 |
| JP | 2014-153876 A | | 8/2014 |
| JP | 2014153876 A | * | 8/2014 |

OTHER PUBLICATIONS

Aloul et al., iBump Smartphone Application to Detect Car Accidents (Year: 2015).*

Adamo et al., Joint encryption error correction and modulation (JEEM) scheme (Year: 2012).*

Chiou et al., A Real-Time, Automated and Privacy-Preserving Mobile Emergency-Medical-Service Network for Informing the Closest Rescuer to Rapidly Support Mobile-Emergency-Call Victims (Year: 2018).*

Hameed et al., A model for ensuring data confidentiality in healthcare and medical emergency (Year: 2011).*

Malik et al., An Overview of Security Challenges in Vehicular Ad-Hoc Networks (Year: 2017).*

Michalas et al., Secure & trusted communication in emergency situations (Year: 2012).*

Pallapa et al., Privacy Infusion in Ubiquitous Computing (Year: 2008).*

International Search Report and Written Opinion of PCT Application No. PCT/JP2017/040123, dated Jan. 16, 2018, 6 pages of ISRWO.

* cited by examiner

INFORMATION PROCESSING DEVICE, AND INFORMATION PROCESSING SYSTEM

CROSS REFERENCE TO RELATED APPLICATIONS

This application is a U.S. National Phase of International Patent Application No. PCT/JP2017/040123 filed on Nov. 7, 2017, which claims priority benefit of Japanese Patent Application No. JP 2016-244328 filed in the Japan Patent Office on Dec. 16, 2016. Each of the above-referenced applications is hereby incorporated herein by reference in its entirety.

TECHNICAL FIELD

The present disclosure relates to an information processing device, a program, and an information processing system.

BACKGROUND ART

A technology related to an emergency report system including a vehicle that detects an accident of the vehicle and makes an emergency report is being developed. Examples of the above-described technology include a technology described in Patent Literature 1 below.

CITATION LIST

Patent Literature

Patent Literature 1: JP 2013-131135A

DISCLOSURE OF INVENTION

Technical Problem

In an emergency report system in which the technology described in Patent Literature 1, for example, is used, a mobile terminal in a state in which mutual communication can be made with a device included in a vehicle is utilized, and in a case in which an accident of the vehicle is detected, an emergency report is made from the vehicle to the outside such as an emergency report center.

However, in the emergency report system in which the technology described in Patent Literature 1 is used, a device included in a vehicle and a mobile terminal need to be in a state in which mutual communication can be made. Therefore, in the emergency report system in which the technology described in Patent Literature 1 is used, it is not possible to make an emergency report in a case in which a specific device in a state in which mutual communication can be made with a device included in the vehicle does not exist, such as a case in which the above-described mobile terminal is broken because of an accident of the vehicle, for example.

The present disclosure proposes an information processing device, a program, and an information processing system that are novel and improved, and can reduce the occurrence of a situation in which a report is not made.

Solution to Problem

According to the present disclosure, there is provided an information processing device including: a processing unit configured to determine whether to make a report on the basis of a detection result of a sensor, and cause report information indicating report contents to be transmitted by broadcasting on the basis of a determination result.

Moreover, according to the present disclosure, there is provided a program for causing a computer to realize functions of: determining whether to make a report on the basis of a detection result of a sensor; and causing report information indicating report contents to be transmitted by broadcasting on the basis of a determination result.

Moreover, according to the present disclosure, there is provided an information processing system including: a first information processing device including a processing unit configured to determine whether to make a report on the basis of a detection result of a sensor, and cause report information indicating report contents to be transmitted by broadcasting on the basis of a determination result; one or two or more relay devices configured to, in a case in which the report information is received, transmit the report information having been received to an external device; and a second information processing device configured to, in a case in which the report information is received, process the report information.

Advantageous Effects of Invention

According to the present disclosure, it is possible to reduce the occurrence of a situation in which a report is not made.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
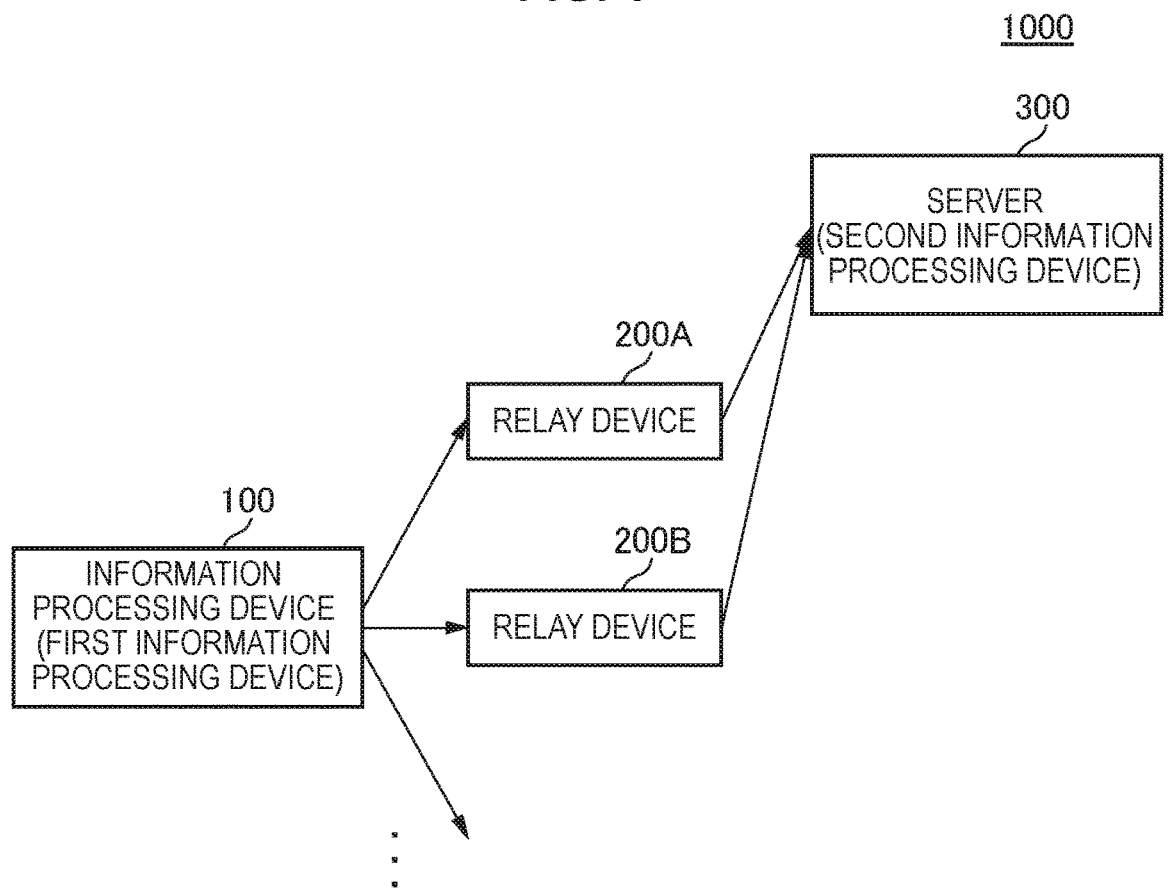
FIG. 1 is an explanatory diagram illustrating an example of a configuration of an information processing system according to the present embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, the following description will proceed in the order described below.
1. Information processing system according to the present embodiment and information processing method according to the present embodiment
2. Program according to the present embodiment (Information Processing System According to the Present Embodiment and Information Processing Method According to the Present Embodiment)

Hereinafter, an information processing method according to the present embodiment will be described while describing an example of an information processing system according to the present embodiment.

FIG. 1 is an explanatory diagram illustrating an example of a configuration of an information processing system 1000 according to the present embodiment. The information processing system 1000 has an information processing device 100 (a first information processing device), relay devices 200A, 200B, . . . , and a server 300 (a second information processing device), for example. Hereinafter, one of the relay devices 200A, 200B, . . . or a collection of the plurality of relay devices 200A, 200B, . . . is indicated as a "relay device 200" in some cases.

Note that the information processing system according to the present embodiment is not limited to the example illustrated in FIG. 1.

For example, FIG. 1 illustrates a configuration having the plurality of relay devices 200, whilst the information processing system according to the present embodiment may have a configuration in which a single relay device 200 is included.

Further, FIG. 1 illustrates an example in which communication from the information processing device 100 to the server 300 is always performed via the relay device 200, whilst in the information processing system according to the present embodiment, communication from the information processing device 100 to the server 300 may not be performed via the relay device 200. That is, the information processing system according to the present embodiment also includes "receipt of a signal (for example, a signal including report information to be described later) transmitted from the information processing device 100 in the server 300 without the intervention of the relay device 200".

Further, as illustrated in a use case to be described later, the information processing system according to the present embodiment may be an information processing system in which the plurality of relay devices 200 transfers a signal (for example, a signal including report information to be described later) in a relay format.

Further, the information processing system according to the present embodiment may have a configuration in which a plurality of information processing devices 100 is included. In a case in which the information processing system has a plurality of information processing devices 100, processing according to information processing information in the information processing device 100 to be described later is performed in each of the information processing devices 100.

[1] Information Processing Device 100 (First Information Processing Device)
[1-1] Processing According to Information Processing Information in Information Processing Device 100

First, processing according to information processing information in the information processing device 100 will be described.

The information processing device 100 determines a state in which reporting is necessary (or a situation in which reporting is necessary; the same shall apply hereinafter), and transmits a signal by broadcasting to make a report. The information processing device 100 transmits a signal including report information to be described later, for example, by broadcasting to make a report.

When the information processing device 100 transmits a signal by broadcasting to make a report, the signal is more likely to be received in a device external to the information processing device 100.

Further, when the information processing device 100 transmits a signal by broadcasting to make a report, a specific device in a state in which mutual communication can be made does not need to exist in the information processing system 1000 as in the case in which the technology described in Patent Literature 1, for example, is used. That is, in the information processing system 1000, the information processing device 100 does not need to be in a state in which mutual communication can be made with an external device. Therefore, in the information processing system 1000, it is possible to reduce "the possibility that a report cannot be made because of the absence of a specific device that may occur in the case in which the technology described in Patent Literature 1, for example, is used.

Consequently, in the information processing system 1000 having the information processing device 100, reduction of the occurrence of a situation in which a report is not made is achieved.

More specifically, the information processing device 100 determines whether to make a report on the basis of a detection result of a sensor. Then, the information processing device 100 causes report information to be transmitted by broadcasting on the basis of a determination result. The information processing device 100 causes report information to be transmitted by broadcasting by, for example, controlling a communication unit (to be described later) included in the information processing device 100 or an external communication device connected to the information processing device 100.

The information processing device 100 determines a state in which reporting is necessary by "comparing a value indicated by the detection result of the sensor and a threshold value having been set", "comparing time-based changes in a value indicated by the detection result of the sensor and a time-based changing pattern having been set", or the like, for example. Then, in a case in which it is determined that a report is to be made, the information processing device 100 causes report information to be transmitted by broadcasting, and in a case in which it is not determined that a report is to be made, the information processing device 100 does not cause report information to be transmitted.

The information processing device 100 causes report information to be transmitted by communication in a communication scheme in which a signal can be transmitted at least by broadcasting. Note that the communication scheme for communication in which report information is transmitted may be a communication scheme in which bidirectional communication can further be made. Specific examples of the communication scheme for communication in which report information is transmitted include "a communication scheme in conformity with the IEEE 802.15.1 standard, such as Bluetooth Low Energy (BLE)", "a communication scheme in conformity with the IEEE 802.11 standard", and the like.

A sensor according to the present embodiment is a sensor that detects a state of a detection target. Examples of the sensor according to the present embodiment include one or two or more sensors capable of detecting a state of a detection target, such as a motion sensor, a position sensor, a biosensor, and a current sensor.

Further, the detection target according to the present embodiment varies depending on the application example of the information processing system 1000. For example, in a case in which the information processing system 1000 is applied to a report system that reports an accident of any moving body such as a vehicle, a motorbike, or a bicycle or a report system that reports a failure of the moving body, the detection target according to the present embodiment is the moving body. Further, for example, in a case in which the information processing system 1000 is applied to a report system that reports an abnormality occurred in any living body such as human or pet, the detection target according to the present embodiment is the living body.

Further, report information according to the present embodiment is data indicating report contents.

For example, the position of a detection target of the sensor is included in the report contents indicated by report information. When the position of the detection target of the sensor is included in the report contents, the position at which an accident, a failure, an abnormality of a living body, or the like has occurred is reported. Thus, the information processing system 1000 easily copes with the accident, the failure, the abnormality of the living body, or the like.

Further, one or both of the detection result of the sensor and the state of the detection target of the sensor may further be included in the report contents indicated by the report information.

By generating report information including data indicating a detection value (an example of a detection result) of the sensor acquired from the sensor, for example, the information processing device 100 causes the report contents indicated by the report information to include the detection result of the sensor.

Further, the information processing device 100 specifies the state of the detection target on the basis of the detection result of the sensor. By referring to "a table (or database) in which a value indicated by the detection result of the sensor and the state of the detection target have been associated" or "a table (or database) in which a time-based changing pattern of the value indicated by the detection result of the sensor and the state of the detection target have been associated", for example, the information processing device 100 specifies the state of the detection target corresponding to the detection result of the sensor.

Note that the method of specifying the state of the detection target on the basis of the detection result of the sensor is not limited to the method of referring to a table as described above. For example, the information processing device 100 may specify the state of the detection target by computing any algorithm that enables the state of the detection target to be specified on the basis of the detection result of the sensor.

By generating report information including data indicating the state of the detection target specified as described above, for example, the information processing device 100 causes the report contents indicated by the report information to include the state of the detection target of the sensor.

When one or both of the detection result of the sensor and the state of the detection target of the sensor are further included in the report contents indicated by the report information, what the occurred accident, failure, abnormality of a living body, or the like is reported. Thus, when one or both of the detection result of the sensor and the state of the detection target of the sensor are further included in the report contents indicated by the report information, the information processing system 1000 is capable of coping with the accident, the failure, the abnormality of the living body, or the like more appropriately.

Note that information included in the signal that the information processing device 100 transmits by broadcasting is not limited to report information.

For example, the information processing device 100 may cause report information and user information to be transmitted by broadcasting on the basis of a determination result of determining whether to make a report on the basis of the detection result of the sensor.

User information according to the present embodiment is information indicating contents related to a user or information indicating an identifier of a user, for example.

A user according to the present embodiment varies depending on the application example of the information processing system 1000. For example, in a case in which the information processing system 1000 is applied to a report system that reports an accident of any moving body or a report system that reports a failure of the moving body, the user according to the present embodiment is a person associated with a moving body which is a detection target of the sensor, such as the owner, driver, or the like of the moving body. Further, in a case in which the information processing system 1000 is applied to a report system that reports an abnormality occurred in any living body, for example, the user according to the present embodiment is a living body which is a detection target of the sensor.

Examples of the information indicating contents related to the user include data indicating one or two or more of the name of the user, the contact (for example, one or two or more of address, telephone number, e-mail address, and the like) of the user, a medical history of the user, and the like. That is, so-called personal data of the user is included in the information indicating the contents related to the user.

Further, examples of the information indicating the identifier of a user include data indicating ID that enables the user to be specified uniquely. In a case in which the user information is information indicating the identifier of the user, the amount of data of the user information can be made smaller than in a case in which the user information is information indicating the contents related to the user.

Here, in a case in which the information processing device 100 causes the user information to be transmitted by broadcasting, the user information can be acquired by a plurality of unspecified external devices with the information processing system 1000.

As described above, personal data of the user may be included in the user information. Therefore, "acquisition of the user information by a plurality of unspecified external devices may be undesirable from the viewpoint of privacy protection and the like".

Therefore, in a case of causing the user information to be transmitted by broadcasting, the information processing device 100 may cause encrypted user information to be transmitted.

The information processing device 100 may read user information encrypted in advance from a recording medium for transmission by broadcasting, or may encrypt user information read from a recording medium, and cause the encrypted user information to be transmitted by broadcasting. The user information is encrypted by an encryption key (for example, a common key shared in the server 300 or a public key of the server 300) that can be decrypted in the server 300, for example.

When the information processing device 100 causes the encrypted user information to be transmitted by broadcasting, user's privacy can be protected even in a case in which user information including personal data of the user is transmitted (that is, in a case in which information indicating the contents related to the user is transmitted).

Note that, when information indicating the identifier of the user is transmitted as the user information, even in a case in which the user information has been acquired by a plurality of unspecified external devices, user's privacy is unlikely to be invaded. Thus, in a case in which information indicating the identifier of the user is transmitted as the user information, the user information to be transmitted may not have been encrypted.

Further, in a case in which the report information and the encrypted user information are transmitted by broadcasting, the information processing device 100 does not encrypt the report information, for example. When the information processing device 100 causes unencrypted report information to be transmitted by broadcasting, and the report information is acquired by a plurality of unspecified external devices, transmittance of report contents indicated by the report information to a larger number of devices (further, a larger number of people) is achieved in the information processing system 1000.

That is, in the information processing system 1000, the security level (non-encryption or encryption) is defined in the report information and the user information, and the information processing device 100 transmits information in accordance with the defined security level by broadcasting. When the security level as described above is defined, "allowing a user of the relay device 200 to view the contents indicated by the report information, but not allowing the user to view the contents indicated by the user information" and "allowing only a user of the server 300 to view the user information" can be achieved, for example.

[1-2] Example of Configuration of Information Processing Device 100

Figure 2:
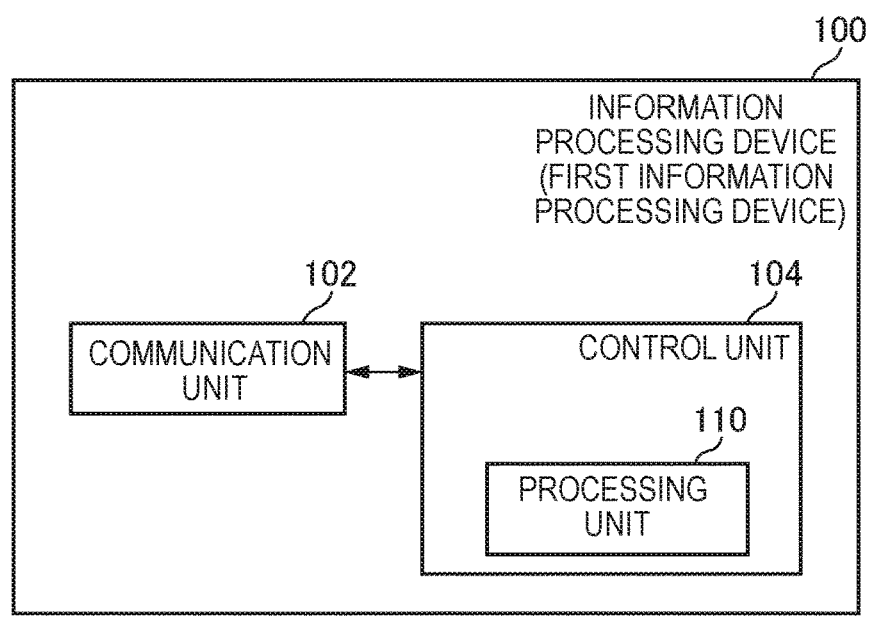
FIG. 2 is a block diagram illustrating an example of a configuration of an information processing device (a first information processing device) according to the present embodiment.

Next, an example of a configuration of the information processing device 100 capable of performing processing according to information processing information described above will be described. FIG. 2 is a block diagram illustrating an example of a configuration of the information processing device 100 (first information processing device) according to the present embodiment. The information processing device 100 includes a communication unit 102 and a control unit 104, for example.

Further, the information processing device 100 may include, for example, a read only memory (ROM) (not illustrated), a random access memory (RAM) (not illustrated), a storage unit (not illustrated), a manipulating unit (not illustrated) which can be manipulated by a user of the information processing device 100, a display unit (not illustrated) that displays various screens on a display screen, and the like. For example, the respective components of the information processing device 100 are connected with one another via a bus serving as a data transmission path.

The ROM (not illustrated) stores a program and control data such as calculation parameters which are used by the control unit 104. The RAM (not illustrated) temporarily stores a program executed by the control unit 104 and the like.

The storage unit (not illustrated) is storage means included in the information processing device 100, and stores various types of data such as data and various applications related to the information processing method according to the present embodiment, for example. Here, examples of the storage unit (not illustrated) include a magnetic recording medium such as a hard disk, a non-volatile memory such as a flash memory, and the like. Further, the storage unit (not illustrated) may be detachable from the information processing device 100.

Examples of the manipulating unit (not illustrated) include a button, a direction key, a rotary type selector such as a jog dial, a combination thereof, and the like. Further, examples of the display unit (not illustrated) include a display device to be described later.

[Hardware Configuration Example of Information Processing Device 100]

Figure 3:
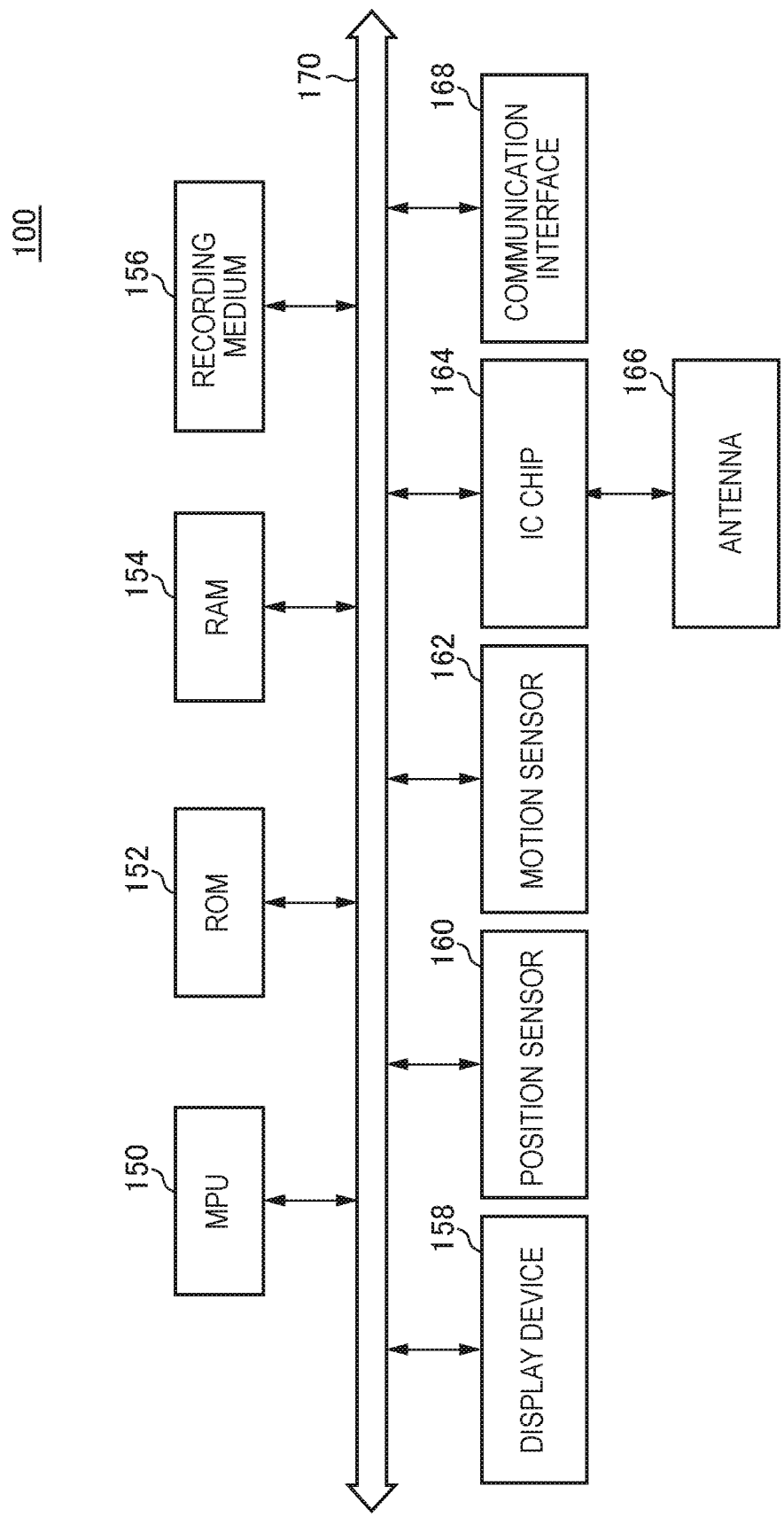
FIG. 3 is an explanatory diagram illustrating an example of a hardware configuration of the information processing device (the first information processing device) according to the present embodiment.

FIG. 3 is an explanatory diagram illustrating an example of a hardware configuration of the information processing device 100 (first information processing device) according to the present embodiment. The information processing device 100 includes an MPU 150, a ROM 152, a RAM 154, a recording medium 156, a display device 158, a position sensor 160, a motion sensor 162, an IC chip 164, an antenna 166, and a communication interface 168, for example. Further, the information processing device 100 connects the respective components with one another with a bus 170 serving as a data transmission path, for example. The information processing device 100 is driven by, for example, electric power supplied from an internal power source such as a battery included in the information processing device 100, electric power supplied from a connected external power source, or the like.

The MPU 150 is constituted by one or two or more processors constituted by a micro processing unit (MPU) or the like, various kinds of processing circuits, or the like, and functions as the control unit 106 that controls the information processing device 100 in general. Further, in the information processing device 100, the MPU 150 also functions as, for example, a processing unit 110 to be described later. Note that the processing unit 110 may include a dedicated (or general-purpose) circuit (for example, a processor separate from the MPU 150, or the like) that can achieve processing of the processing unit 110.

The ROM 152 stores a program, control data such as calculation parameters, and the like which are used by the MPU 150. The RAM 154 temporarily stores, for example, a program or the like executed by the MPU 150.

The recording medium 156 functions as a storage unit (not illustrated), and stores, for example, various types of data such as data according to the information processing method of the present embodiment or various kinds of applications. Here, examples of the recording medium 156 include a magnetic recording medium such as a hard disk and a non-volatile memory such as a flash memory. Further, the recording medium 156 may be removable from the information processing device 100. Further, the storage unit (not illustrated) may be a tamper-resistant recording medium such as a non-volatile memory (to be described later) included in the IC chip 164.

The display device 158 functions as a display unit (not illustrated), and displays various screens on a display screen. Examples of the display device 158 include a liquid crystal display, an organic electro-luminescence display (organic EL display) (or may also be called an organic light emitting diode display (OLED display)), and the like. Further, the display device 158 may be a device that enables display and manipulation, such as a touch panel, for example.

The position sensor 160 is a sensor included in the information processing device 100, and detects a position (or estimates a position). Examples of the position sensor 160 include "a sensor that detects an absolute position, such as a global navigation satellite system (GNSS) device", "a device that estimates a position utilizing communication in any communication scheme, such as a device that estimates a position utilizing a wireless communication scheme such as Ultra Wide Band (UWB)", and the like.

The motion sensor 162 is another sensor included in the information processing device 100, and detects a motion. Examples of the motion sensor 162 include one or two or more sensors that can detect a motion, such as one or two or more sensors among an acceleration sensor, an angular velocity sensor, and a geomagnetic sensor.

The IC chip 164 and the antenna 166 are one type of communication means included in the information processing device 100. The IC chip 164 and the antenna 166 perform contactless communication according to near field communication (NFC) defined by ISO/IEC18092 with an external device such as a reader/writer using carrier waves of a predetermined frequency, such as 13.56 [MHz], for example. The antenna 166 plays a role of receiving carrier waves and transmitting a response signal. Further, the IC chip 164 demodulates and processes a carrier wave signal transmitted from an external device such as the reader/writer on the basis of received carrier waves, and causes the response signal to be transmitted through load modulation.

Figure 4:
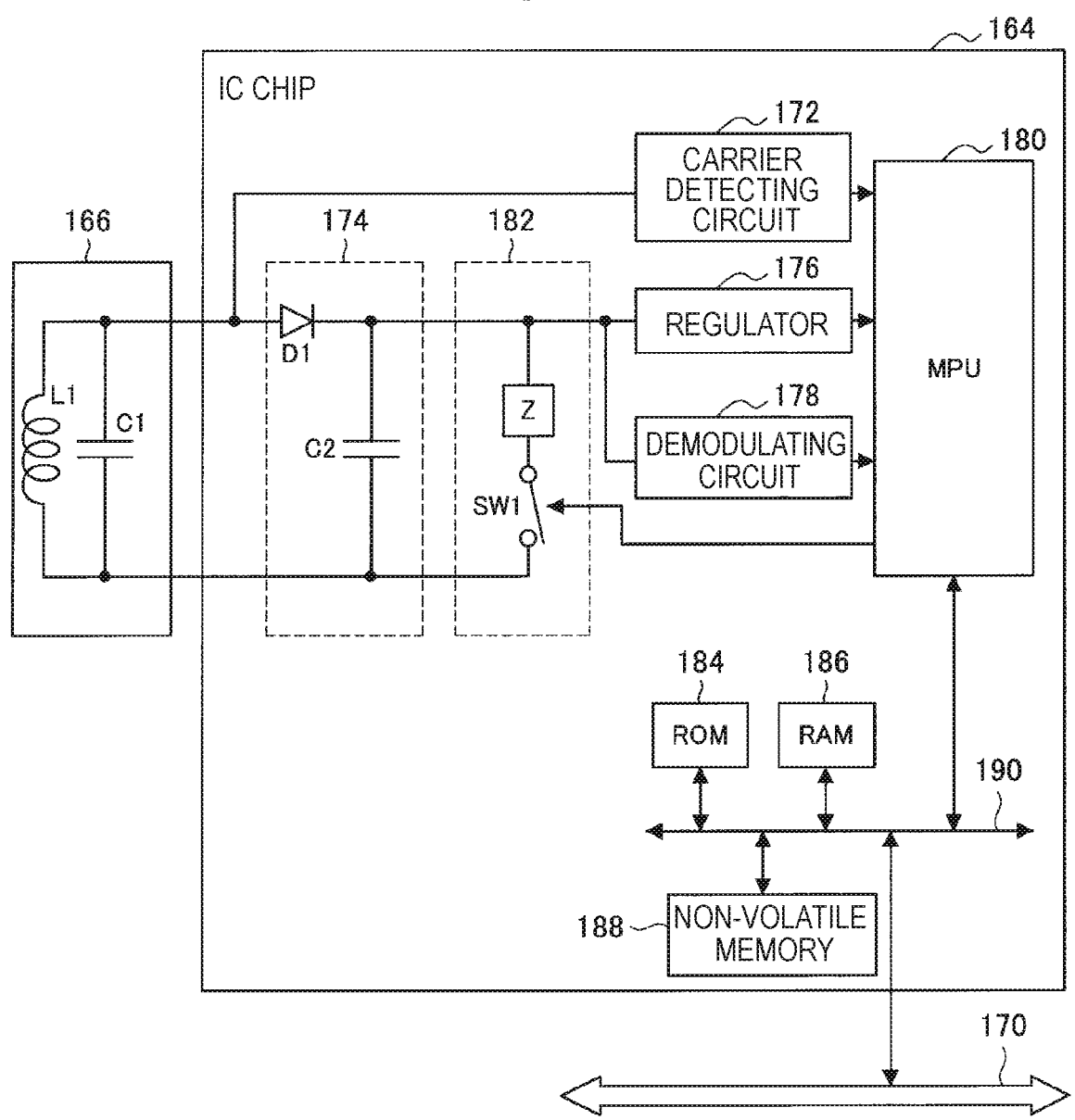
FIG. 4 is an explanatory diagram illustrating an example of a configuration of an IC chip and an antenna illustrated in FIG. 3.

FIG. 4 is an explanatory diagram illustrating an example of a configuration of the IC chip 164 and the antenna 166 illustrated in FIG. 3. Further, for example, the information processing device 100 may not have a configuration of the IC chip 164 illustrated in FIG. 4 in the form of an IC chip.

The antenna 166 is constituted by a resonance circuit including, for example, a coil (inductor) L1 having a predetermined inductance and a capacitor C1 having a predetermined capacitance, and generates an inductive voltage through electromagnetic induction in response to the reception of the carrier wave. Further, the antenna 166 outputs a reception voltage obtained by resonating the inductive voltage at a predetermined resonance frequency. Here, the resonance frequency of the antenna 166 is set in accordance with a frequency of the carrier wave such as, for example, 13.56 MHz. The antenna 166 receives the carrier wave through the above configuration and transmits a response signal through load modulation performed in a load modulation circuit 182 of the IC chip 164.

The IC chip 164 includes, for example, a carrier detecting circuit 172, a detecting circuit 174, a regulator 176, a demodulating circuit 178, an MPU 180, and a load modulation circuit 182. Further, although not illustrated in FIG. 4, the IC chip 164 may further include, for example, a protection circuit (not illustrated) for preventing an overvoltage or an overcurrent from being applied to the MPU 180. Here, for example, a clamp circuit constituted by a diode or the like can be used as the protection circuit (not illustrated).

Further, the IC chip 164 includes, for example, a ROM 184, a RAM 186, and a non-volatile memory 188. For example, the MPU 180, the ROM 184, the RAM 186, and the non-volatile memory 188 are connected via a bus 190 as a data transmission path. Further, the bus 190 is connected to the bus 170.

The ROM 184 stores a program, control data such as calculation parameters, and the like which are used by the MPU 180. The RAM 186 temporarily stores, for example, a program, a calculation result, an execution state, or the like executed by the MPU 180.

The non-volatile memory 188 stores various types of data such as data related to the information processing method according to the present embodiment, such as user information, applications, and the like, for example. Here, examples of the non-volatile memory 188 include an electrically erasable and programmable read only memory (EEPROM), a flash memory, and the like.

Further, the non-volatile memory 188 is tamper resistant, for example. When user information is stored in a tamper-resistant secure recording medium such as the non-volatile memory 188, user's privacy is protected in the information processing device 100.

Recording (new recording or updating) of information such as user information in the non-volatile memory 188 included in the IC chip 164 is performed by, for example, one or both of NFC communication with an external device via the antenna 166 and communication with an external device via the communication interface 168, such as BLE communication. When recording of information in the non-volatile memory 188 included in the IC chip 164 is performed as described above, an environment in which an automobile dealer or the like writes information in a tamper-resistant secure recording medium (an example of an environment in a case in which the information processing device 100 is a vehicle or on-board equipment provided for the vehicle), for example, is easily achieved.

The carrier detecting circuit 172 generates, for example, a rectangular detection signal on the basis of a reception voltage transferred from the antenna 166, and transmits the detection signal to the MPU 180. Further, for example, the MPU 180 uses the transferred detection signal as a process clock for data processing. Here, since the detection signal is a signal based on the reception voltage transferred from the antenna 166, the detection signal is synchronized with a frequency of the carrier wave transmitted from an external device such as the reader/writer. Therefore, since the carrier detecting circuit 172 is installed, the IC chip 164 can perform a process with an external device such as the reader/writer 200 in synchronization with an external device.

The detecting circuit 174 rectifies the reception voltage output from the antenna 166. Here, the detecting circuit 174 includes, for example, a diode D1 and a capacitor C2.

The regulator 176 smooths the reception voltage to be a constant voltage, and outputs a drive voltage to the MPU 180. Here, the regulator 176 uses a DC component of the reception voltage as the driving voltage.

The demodulating circuit 178 demodulates the carrier wave signal on the basis of the reception voltage and outputs data (for example, a binary data signal of a high level and a low level) corresponding to the carrier wave signal included in the carrier wave. Here, the demodulating circuit 178 outputs an AC component of the reception voltage as data.

The MPU 180 is driven using the drive voltage output from the regulator 176 as electric power and processes the data demodulated in the demodulating circuit 178. Here, the MPU 180 includes one or two or more processors constituted by a calculating circuit such as, for example, an MPU, various kinds of processing circuits, or the like.

Further, the MPU 180 selectively generates a control signal for controlling the load modulation related to a response to an external device such as the reader/writer in accordance with a processing result. Then, the MPU 180 selectively outputs the control signal to the load modulation circuit 182.

The load modulation circuit 182 includes, for example, a load Z and a switch SW1, and selectively connects (activates) the load Z in accordance with the control signal transferred from the MPU 180 and performs the load modulation. Here, the load Z includes, for example, a resistor having a predetermined resistance value. Further, the switch SW1 is constituted by, for example, a p-channel metal oxide semiconductor field effect transistor (MOSFET) or an n-channel MOSFET.

With the above configuration, the IC chip 164 can process the carrier wave signal received by the antenna 166 and cause the antenna 166 to transmit the response signal through the load modulation.

The IC chip 164 and the antenna 166 have, for example, the configuration illustrated in FIG. 4, and perform NFC contactless communication with an external device such as the reader/writer or the like using carrier waves of a predetermined frequency. Further, it will be appreciated that the configuration of the IC chip 164 and the antenna 166 according to the present embodiment is not limited to the example illustrated in FIG. 4.

With reference to FIG. 3 again, an example of a hardware configuration of the information processing device 100 according to the present embodiment will be described. The communication interface 168 is another type of communication means included in the information processing device 100, and functions as the communication unit 102.

The communication interface 168 makes communication with an external device by communication in a communication scheme in which a signal can be transmitted at least by broadcasting, for example. Note that, as described above, the communication scheme to which the communication interface 168 is adapted may be a communication scheme in which bidirectional communication can further be made.

Here, examples of the communication interface 168 include an IEEE 802.15.1 port and a transceiving circuit, an IEEE 802.11 port and a transceiving circuit, and the like.

The information processing device 100 performs processing according to the information processing method according to the present embodiment with the configuration illustrated in FIG. 3, for example. Note that the hardware configuration of the information processing device 100 according to the present embodiment is not limited to the configuration illustrated in FIG. 3.

For example, in a case in which the information processing device 100 makes communication with an external device via an external communication device having a communication function similar to that of the communication interface 168, the information processing device 100 may not include the communication interface 168.

Further, FIG. 3 illustrates an example in which the information processing device 100 includes the position sensor 160 and the motion sensor 162 as sensors according to the present embodiment, whilst the information processing device 100 may include one or two or more sensors capable of detecting the state of a detection target as described above. To cite an example, the information processing device 100 can include one or two or more sensors among a motion sensor, a position sensor, a biosensor, and a current sensor.

Further, in a case in which the information processing device 100 processes a detection result acquired from an external sensor having functions similar to those of one or both of the position sensor 160 and the motion sensor 162, for example, the information processing device 100 may not include one or both of the position sensor 160 and the motion sensor 162. That is, the information processing device 100 is capable of processing one or both of a detection result acquired from a sensor included in the information processing device 100 and a detection result acquired from an external sensor.

Further, the information processing device 100 may have a configuration in which the IC chip 164 and the antenna 166 are not included. Further, the information processing device 100 can have a configuration in which, for example, one or both of the recording medium 156 and the display device 158 are not included.

Further, for example, the information processing device 100 can have a configuration according to an application example of the information processing device 100 to be described later.

Further, for example, a part or all of the configuration illustrated in FIG. 3 (or a configuration according to a modified example) may be realized by one or two or more ICs.

An example of a configuration of the information processing device 100 will be described with reference to FIG. 2 again. The communication unit 102 is communication means included in the information processing device 100, and at least has a function of transmitting a signal by broadcasting. Further, the communication unit 102 may have a function of making bidirectional communication with an external device. Communication of the communication unit 102 is controlled by the control unit 104, for example.

Here, examples of the communication unit 102 include an IEEE 802.15.1 port and a transceiving circuit, an IEEE 802.11 port and a transceiving circuit, and the like. Further, the communication unit 102 may have a configuration capable of performing communication with one or two or more external devices and the like in accordance with a plurality of communication schemes.

The control unit 104 is implemented by an MPU or the like, for example, and plays a role of controlling the information processing device 100 in general. Further, the control unit 104 has the processing unit 110, for example, and plays a role of taking the initiative of performing processing according to the information processing method according to the present embodiment in the information processing device 100 described above.

The processing unit 110 plays a role of taking the initiative of performing processing according to the information processing method according to the present embodiment in the information processing device 100.

For example, the processing unit 110 determines whether to make a report on the basis of a detection result of the sensor, and causes report information to be transmitted by broadcasting on the basis of a determination result. Further, the processing unit 110 may cause report information and user information to be transmitted by broadcasting on the basis of the determination result. The processing unit 110 delivers a transmission instruction and information to be transmitted to the communication unit 102 (or a connected external communication device) to cause the communication unit 102 or the like to transmit a signal by broadcasting.

Further, the configuration of the information processing device according to the present embodiment (the first information processing device) is not limited to the configuration illustrated in FIG. 2.

For example, the information processing device according to the present embodiment may include the processing unit 110 illustrated in FIG. 2 separately from the control unit 104 (which is realized by, for example, another processing circuit).

Further, the configuration of the information processing device according to the present embodiment is not limited to the configuration illustrated in FIG. 2, and it is possible to employ a configuration corresponding to a way of separating the process according to the information processing method according to the present embodiment in the information processing device 100 described above.

To cite an example, the information processing device according to the present embodiment may have a configuration in which a determination unit (not illustrated) that performs processing of determining whether to make a report on the basis of a detection result of the sensor and a transmission control unit (not illustrated) that causes report information (or report information and user information) to be transmitted by broadcasting are included. Further, to cite another example, the information processing device according to the present embodiment can have a configuration in which an encryption processing unit (not illustrated) that performs processing related to encryption is further included.

Further, for example, in a case in which communication with an external device is performed via an external communication device having a function and configuration similar to those of the communication unit 102, the information processing device according to the present embodiment may not include the communication unit 102.

[2] Relay Device 200

In a case in which report information is received, the relay device 200 transmits the received report information to an external device. Further, in a case in which report information and user information are received, the relay device 200 transmits the received report information and user information to an external device.

The relay device 200 may transmit the received report information or the like by broadcasting to an unspecified external device, or may transmit the received report information or the like to a predetermined device having been set in advance.

[Hardware Configuration Example of Relay Device 200]

Figure 5:
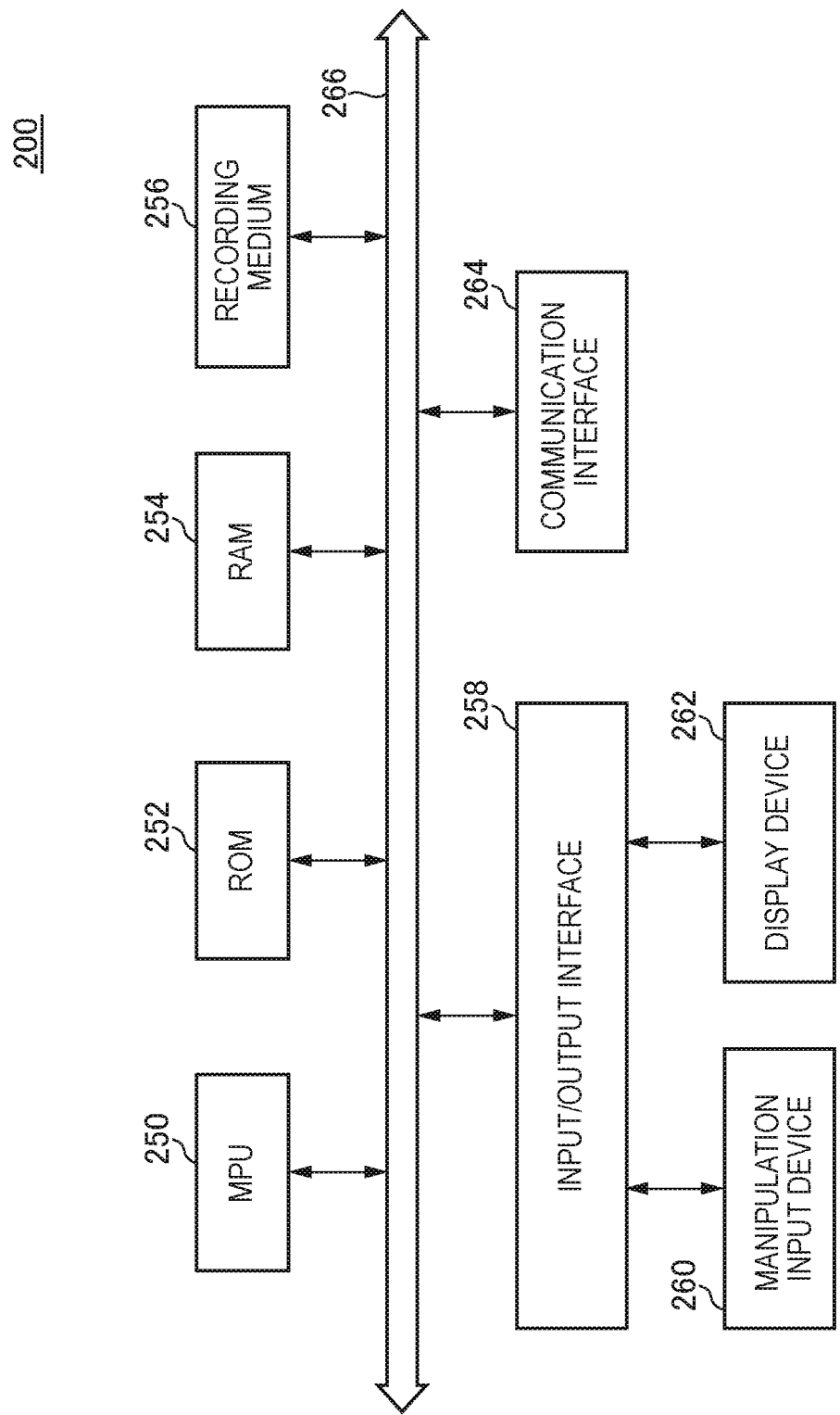
FIG. 5 is an explanatory diagram illustrating an example of a hardware configuration of a relay device according to the present embodiment.

FIG. 5 is an explanatory diagram illustrating an example of a hardware configuration of the relay device 200 according to the present embodiment. The relay device 200 includes, for example, an MPU 250, a ROM 252, a RAM 254, a recording medium 256, an input/output interface 258, a manipulation input device 260, a display device 262, and a communication interface 264. Further, for example, the respective components of the relay device 200 are connected with one another via a bus 266 serving as a data transmission path. Further, the relay device 200 is driven by, for example, electric power supplied from an internal power source such as a battery included in the relay device 200, electric power supplied from a connected external power source, or the like.

The MPU 250 is constituted by one or two or more processors constituted by a calculating circuit such as, for example, an MPU, various kinds of processing circuits, or the like, and functions as a control unit (not illustrated) that controls the relay device 200 in general.

The ROM 252 stores a program, control data such as calculation parameters, and the like which are used by the MPU 250. The RAM 254 temporarily stores, for example, a program or the like executed by the MPU 250.

The recording medium 256 functions as a storage unit (not illustrated) and stores various types of data such as, for example, various kinds of applications. Here, examples of the recording medium 256 include a magnetic recording medium such as a hard disk and a non-volatile memory such as a flash memory. Further, the recording medium 256 may be detachable from the relay device 200.

The input/output interface 258 connects, for example, the manipulation input device 260 or the display device 262. The manipulation input device 260 functions as a manipulating unit (not illustrated), and the display device 262 functions as a display unit (not illustrated). Here, examples of the input/output interface 258 include a USB terminal, a digital visual interface (DVI) terminal, a high-definition multimedia interface (HDMI) (registered trademark) terminal, and various kinds of processing circuits.

Further, for example, the manipulation input device 260 is installed on the relay device 200 and is connected with the input/output interface 258 in the relay device 200. For example, a button, a direction key, a rotary type selector such as a jog dial, a combination thereof, or the like can be used as the manipulation input device 260.

Further, for example, the display device 262 is installed on the relay device 200 and is connected with the input/output interface 258 in the relay device 200. For example, a liquid crystal display or an organic EL display can be used as the display device 262.

Further, it will be appreciated that the input/output interface 258 can be connected to an external device such as a manipulation input device (for example, a keyboard, a mouse, or the like) outside the relay device 200 or an external display device. Further, the display device 262 may be a device on which display and a manipulation can be performed such as a touch screen.

The communication interface 264 is communication means included in the relay device 200. A communication scheme of the communication interface 264 is adapted to a communication scheme of communication in which the information processing device 100 transmits report information or the like, for example. Examples of the communication interface 264 include an IEEE 802.15.1 port and a transceiving circuit, an IEEE 802.11 port and a transceiving circuit, and the like. Further, the communication interface 264 may have a configuration capable of performing communication with one or two or more external devices or the like in accordance with a plurality of communication schemes.

In a case in which report information is received by the configuration illustrated in FIG. 5, for example, the relay device 200 transmits the received report information to an external device. Further, in a case in which report information and user information are received by the configuration illustrated in FIG. 5, for example, the relay device 200 transmits the received report information and user information to an external device.

Note that the hardware configuration of the relay device 200 according to the present embodiment is not limited to the configuration illustrated in FIG. 5.

For example, in a case in which communication with an external device or the like is performed via a connected external communication device, the relay device 200 may not include the communication interface 264. Further, the communication interface 264 may have a configuration capable of performing communication with one or two or more external devices or the like in accordance with a plurality of communication schemes.

Further, the relay device 200 may have a configuration in which, for example, one or two or more of the recording medium 256, the manipulation input device 260, and the display device 262 are not included.

Further, for example, the relay device 200 can have a configuration according to an application example of the relay device 200 to be described later.

Further, for example, a part or all of the configuration illustrated in FIG. 5 (or a configuration according to a modified example) may be realized by one or two or more ICs.

[3] Server 300 (Second Information Processing Device)

In a case in which report information is received, the server 300 processes the report information. Further, in a case in which report information and user information are received, the server 300 processes the report information and the user information.

As an example of processing in the server 300, processing of automatically notifying a set notification target such as the police or a fire department of "report contents indicated by report information" or "the report contents and contents related to a user specified by user information" is included, for example. The server 300 makes a notification to a set notification target by any method in which it is possible to make a report to the set notification target, such as a notification by text or an image through use of e-mail, or a notification by voice through use of a telephone, for example. Here, the notification to the above-described set notification target is equivalent to making a report to the above-described set notification target by the server 300. Hereinafter, a set notification target such as the police or a fire department may be indicated as a "report destination".

In a case in which the received user information is information indicating contents related to the user, the server 300 specifies the contents related to the user indicated by the received user information as the contents related to the user specified by user information. Further, in a case in which the received user information is information indicating an identifier of the user, the server 300 refers to a table (or database) in which an identifier and information indicating the contents related to the user are associated, for example, to specify the contents related to the user corresponding to the user information.

Further, in a case in which the received user information has been encrypted, the server 300 decrypts the received user information to process the user information.

Note that the example of processing in the server 300 is not limited to the example indicated above.

For example, in a case in which the user information is received, the server 300 may perform processing of notifying a contact specified by the user information of report contents indicated by report information. By any method in which it is possible to make a notification to a contact specified by the user information, such as a notification by text or an image through use of e-mail, or a notification by voice through use of a telephone, for example, the server 300 makes a notification to the contact.

Further, the server 300 can also perform processing of notifying an administrator or operator of the server 300 of "report contents indicated by report information" or "the report contents and contents related to a user specified by user information". The server 300 makes a notification to the administrator or operator of the server 300 by any method in which it is possible to make a notification to the administrator or operator of the server 300, such as display on a display screen, sound output from a sound output device such as a speaker, or a combination thereof, for example.

In a case in which the server 300 performs processing of notifying the administrator or operator of the above-described server 300, a report to a set notification target such as the police or a fire department and a notification to a contact specified by user information are each performed manually by the administrator, operator, or the like of the server 300 or the like, for example.

[Hardware Configuration Example of Server 300]

Figure 6:
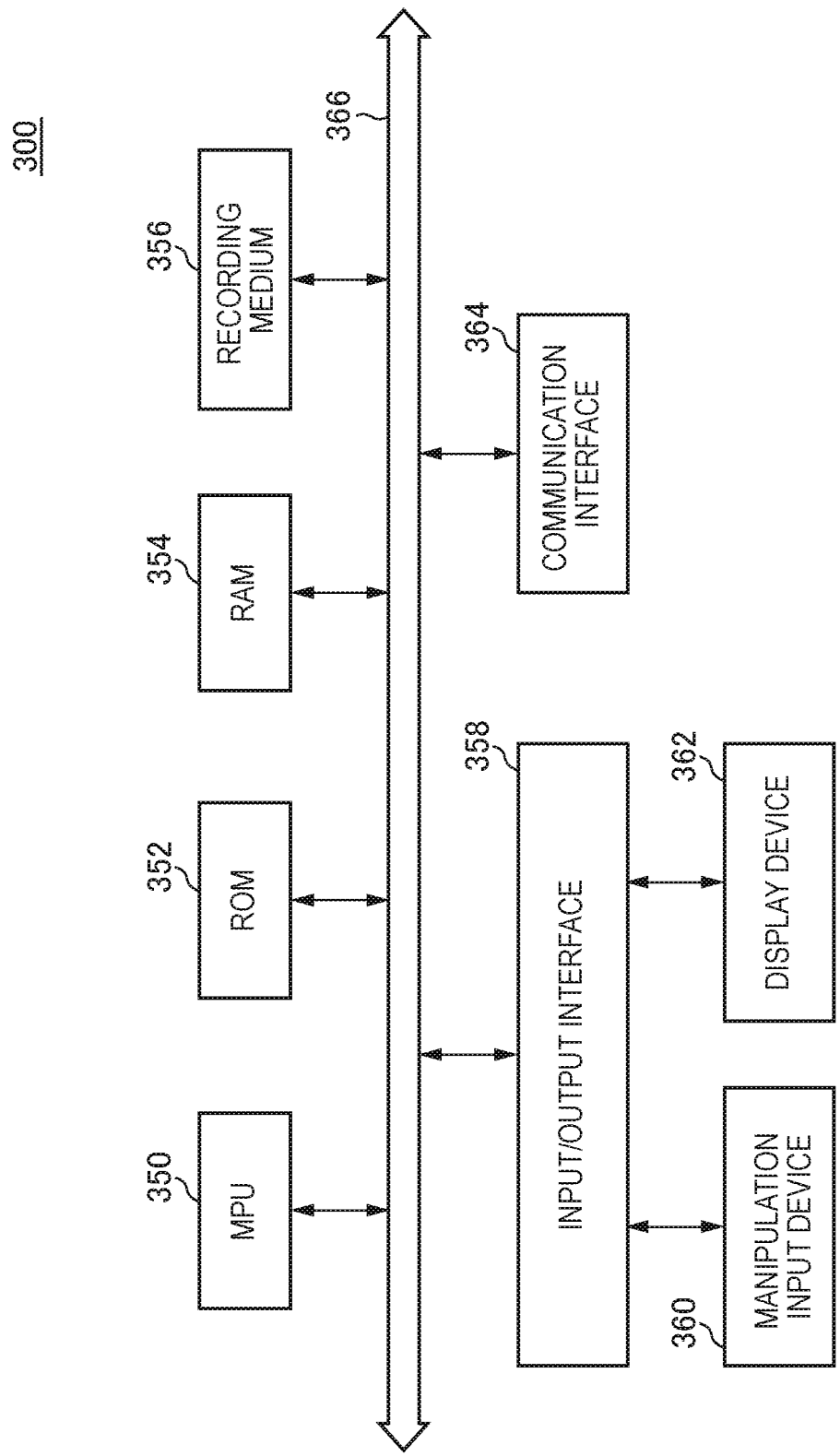
FIG. 6 is an explanatory diagram illustrating an example of a hardware configuration of a server according to the present embodiment.

FIG. 6 is an explanatory diagram illustrating an example of a hardware configuration of the server 300 according to the present embodiment. The server 300 includes, for example, an MPU 350, a ROM 352, a RAM 354, a recording medium 356, an input/output interface 358, a manipulation input device 360, a display device 362, and a communication interface 364. Further, for example, the respective components of the server 300 are connected with one another via a bus 366 serving as a data transmission path. Further, the server 300 is driven by, for example, electric power supplied from an internal power source such as a battery included in the server 300, electric power supplied from a connected external power source, or the like.

The MPU 350 is constituted by one or two or more processors constituted by a calculating circuit such as, for example, an MPU, various kinds of processing circuits, or the like, and functions as a control unit (not illustrated) that controls the server 300 in general.

Further, in the server 300, the MPU 350 plays a role of the processing unit (not illustrated) that takes the initiative of performing processing in the server 300 described above, for example. Note that the processing unit (not illustrated) may include a dedicated (or general-purpose) circuit (for example, a processor separate from the MPU 350, or the like).

The ROM 352 stores a program, control data such as calculation parameters, and the like which are used by the MPU 350. The RAM 354 temporarily stores, for example, a program executed by the MPU 250.

The recording medium 356 functions as a storage unit (not illustrated) and stores various types of data such as, for example, various kinds of applications. Here, examples of the recording medium 356 include a magnetic recording medium such as a hard disk and a non-volatile memory such as a flash memory. Further, the recording medium 256 may be detachable from the relay device 200.

The input/output interface 358 connects, for example, the manipulation input device 360 or the display device 362. The manipulation input device 360 functions as a manipulating unit (not illustrated), and the display device 362 functions as a display unit (not illustrated). Here, examples of the input/output interface 358 include a USB terminal, a DVI terminal, an HDMI (registered trademark) terminal, and various kinds of processing circuits.

Further, for example, the manipulation input device 360 is installed on the server 300 and is connected with the input/output interface 358 in the server 300. For example, a button, a direction key, a rotary type selector such as a jog dial, a combination thereof, or the like can be used as the manipulation input device 360.

Further, for example, the display device 362 is installed on the server 300 and is connected with the input/output interface 358 in the server 300. For example, a liquid crystal display or an organic EL display can be used as the display device 362.

Further, it will be appreciated that the input/output interface 358 can be connected to an external device such as a manipulation input device (for example, a keyboard, a mouse, or the like) outside the server 300 or an external display device. Further, the display device 362 may be a device on which display and a manipulation can be performed such as a touch screen.

The communication interface 364 is communication means included in the server 300, and functions as a communication unit (not illustrated) for performing wireless or wired communication with an external device such as the relay device 200 via a network (or directly). Examples of the network according to the present embodiment include a wired network such as a local area network (LAN) or a wide area network (WAN), a wireless network such as a wireless local area network (WLAN), and the Internet using a communication protocol such as Transmission Control Protocol/Internet Protocol (TCP/IP).

Here, for example, a communication antenna and an RF circuit (wireless communication), an IEEE 802.15.1 port and a transceiving circuit (wireless communication), an IEEE 802.11 port and a transceiving circuit (wireless communication), a LAN terminal and a transceiving circuit (wired communication), or the like can be used as the communication interface 364. Further, the communication interface 264 may be any component adapted to the network according to the present embodiment.

In a case in which report information is received by the configuration illustrated in FIG. 6, for example, the server 300 processes the report information. Further, in a case in which report information and user information are received by the configuration illustrated in FIG. 6, for example, the server 300 processes the report information and the user information.

Note that the hardware configuration of the server 300 according to the present embodiment is not limited to the configuration illustrated in FIG. 6.

For example, in a case in which communication with an external device or the like is performed via a connected external communication device, the server 300 may not include the communication interface 364. Further, the communication interface 364 may have a configuration capable of performing communication with one or two or more external devices or the like in accordance with a plurality of communication schemes.

Further, the server 300 may have a configuration in which, for example, one or two or more of the recording medium 356, the manipulation input device 360, and the display device 362 are not included.

Further, for example, the server 300 can have a configuration according to an application example of the server 300 to be described later.

Further, for example, a part or all of the configuration illustrated in FIG. 6 (or a configuration according to a modified example) may be realized by one or two or more ICs.

[4] Application Examples of Each Device Included in Information Processing System According to the Present Embodiment The information processing device 100 (first information processing device) has been described above as a structural element of the information processing system according to the present embodiment, whilst the present embodiment is not limited to such a form. The present embodiment can be applied to various types of equipment capable of performing processing according to the information processing method according to the present embodiment in the information processing device 100, such as "various moving bodies such as a vehicle, a motorbike, and a bicycle", "equipment provided for a moving body, such as on-board equipment provided for a vehicle", "various wearable devices mounted on the user's body for usage, such as a head mount display, an eyewear-type device, a watch-type device, and a wrist band-type device", "a communication device such as a smartphone", "a tablet-type device", "a game console", and the like, for example. Further, the present embodiment can also be applied to a processing IC that can be incorporated into equipment as described above, for example.

Further, the relay device 200 has been described above as a structural element of the information processing system according to the present embodiment, whilst the present embodiment is not limited to such a form. The present embodiment can be applied to various types of equipment having a function of relaying communication, such as a smartphone or a BLE transceiver, for example.

The relay device 200 such as a BLE transceiver may be installed in a lighting installed on the road or the like, for example. When the relay device 200 is installed in the above-described lighting, a power source of the relay device 200 can be ensured easily. Further, when the relay device 200 is installed in the above-described lighting, an information processing system in which the plurality of relay devices 200 can transfer report information or the like in a relay format is realized, as indicated in a use case to be described later. Furthermore, in a case in which the relay device 200 installed in the above-described lighting is a BLE transceiver, it is considered that an installation hurdle for installing the BLE transceiver in the above-described lighting is low because the BLE transceiver is inexpensive.

Further, the server 300 (second information processing device) has been described above as a structural element of the information processing system according to the present embodiment, whilst the present embodiment is not limited to such a form. The present embodiment can be applied to various types of equipment capable of performing processing according to the information processing method according to the present embodiment in the server 300 described above, such as "a computer such as a personal computer (PC) or a server", "a tablet-type device", and "a communication device such as a smartphone", for example. Further, the present embodiment can also be applied to a processing IC that can be incorporated into equipment as described above, for example.

Further, the server 300 according to the present embodiment may be applied to a processing system premised on connection to a network (or communication between respective devices), such as cloud computing, for example. As an example of the above-described processing system, "a system in which partial processing of processing in the server 300 described above is performed by a single device included in a processing system, and processing other than the partial processing is performed by another device included in the processing system" or the like can be used.

[5] Use Case of Information Processing System According to the Present Embodiment Next, referring to a use case of the information processing system 1000, an example of processing in the information processing system 1000 will be described.

Figure 7:
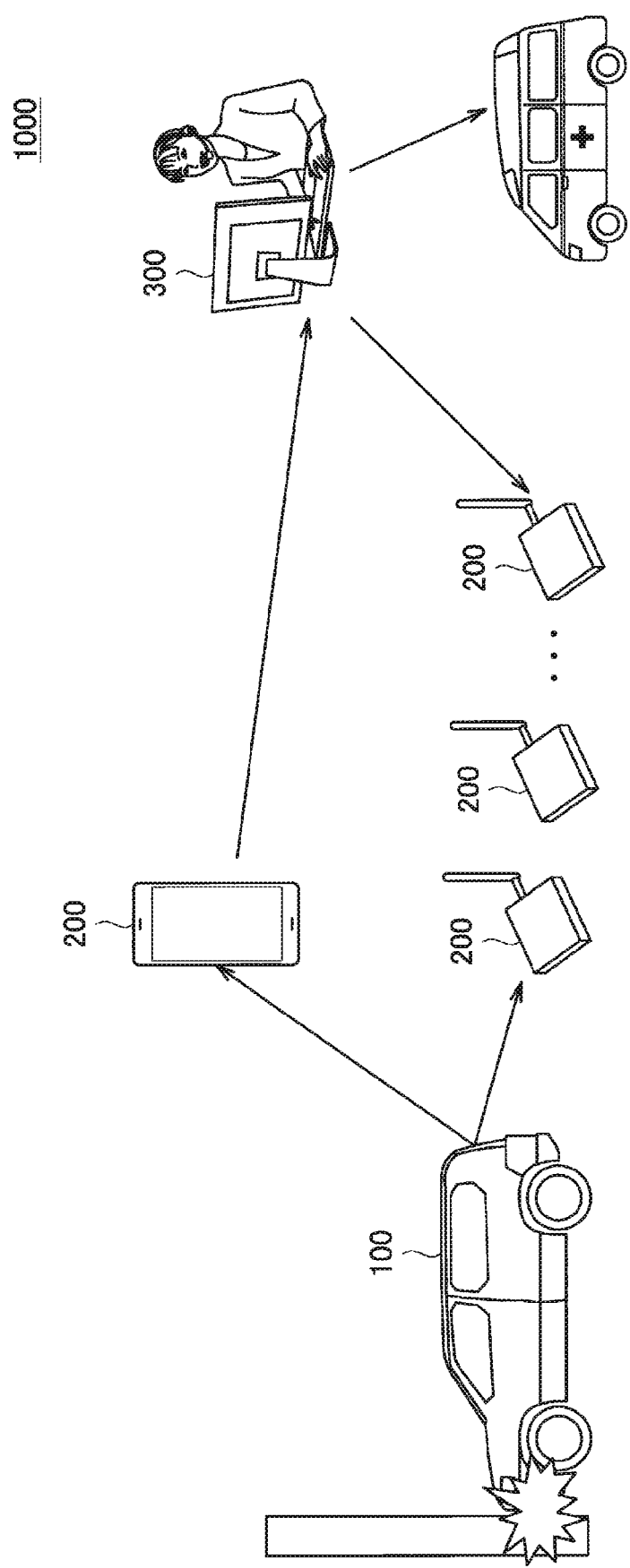
FIG. 7 is an explanatory diagram illustrating an example of a use case of the information processing system according to the present embodiment.

FIG. 7 is an explanatory diagram illustrating an example of a use case of the information processing system 1000 according to the present embodiment. FIG. 7 illustrates an example of a use case in a case in which the information processing device 100 is on-board equipment provided for a vehicle, and the information processing system 1000 is a report system that reports an accident of the vehicle. Further, FIG. 7 illustrates an example in which the relay device 200 serves as a smartphone and a BLE transceiver. Further, FIG. 7 illustrates an example in which the server 300 is a server provided at an emergency report center that makes a report to a fire station or a police station in a case in which an accident has occurred.

Hereinafter, using the use case of the information processing system 1000 illustrated in FIG. 7 as an example, an example of processing in the information processing system 1000 will be described. Note that it will be appreciated that the use case of the information processing system 1000 according to the present embodiment is not limited to the use case illustrated in FIG. 7.

[5-1] First Example of Processing in Information Processing System 1000

Figure 8:
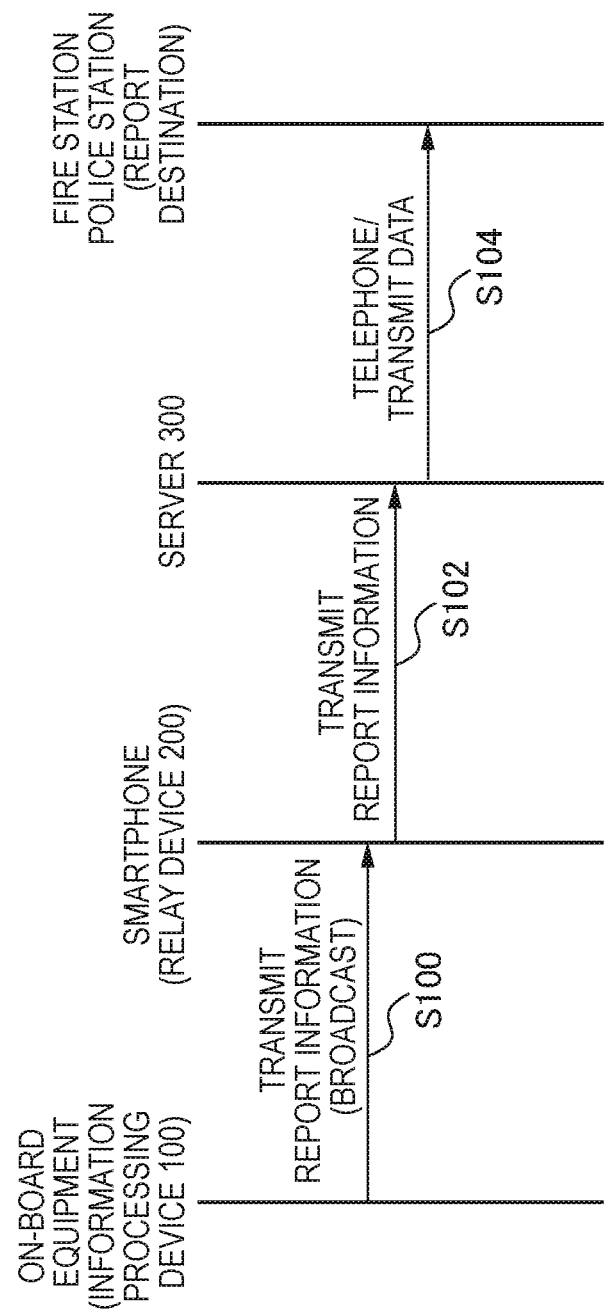
FIG. 8 is an explanatory diagram for describing a first example of processing in the information processing system according to the present embodiment.

FIG. 8 is an explanatory diagram for describing a first example of processing in the information processing system 1000 according to the present embodiment. FIG. 8 illustrates an example of processing in the information processing system 1000 in a case in which a report via a smartphone (an example of the relay device 200; the same shall apply hereinafter) illustrated in FIG. 7 is realized.

In a case in which it is determined that a report is to be made on the basis of a detection result of a sensor, on-board equipment (an example of the information processing device 100; the same shall apply hereinafter) transmits, by broadcasting, report information for reporting that an accident has occurred in a vehicle on which the on-board equipment is mounted (S100). Further, the on-board equipment may transmit user information by broadcasting together with the report information.

The smartphone having received the report information transmitted from the on-board equipment in step S100 transmits the received report information to the server 300 (an example of a predetermined device having been set in advance) set in a report application being executed (S102). Further, in a case in which report information and user information are received, the smartphone transmits the received report information and user information to the server 300.

Further, the smartphone may notify a user of the smartphone of one or both of a fact that the report information has been received and a fact that the report information has been received, for example. The smartphone notifies the user of the smartphone by "a visual notification method by causing text or an image to be displayed on a display screen, turning on a lamp, or the like", "an audible notification method by causing sound (including music) to be output from a sound output device such as a speaker, or the like", or a combination thereof.

The server 300 having received the report information transmitted from the smartphone in step S102 processes the received report information, and makes a notification by such as a notification by voice through use of a telephone or a notification by transmitting data through use of e-mail, for example, to a set notification target such as a fire station or a police station (S104).

Further, in a case in which report information and user information are received, the server 300 processes the report information and the user information, and makes a notification to the set notification target such as a fire station or a police station. At this time, in a case in which the received user information has been encrypted, the server 300 decrypts the received user information to process the user information.

Note that the server 300 may notify the notification target of contents indicated by another type of information stored in a recording medium or the like in addition to the contents indicated by the information transmitted from the smartphone in step S102. The server 300 refers to a table (or a database) in which report information and another type of information are associated, a table (or a database) in which user information and another type of information are associated, or the like, for example, to specify another type of information corresponding to the received information (report information or report information and user information).

When the server 300 performs the processing in step S104 so that a fire station or a police station is notified of an accident, paramedics in the fire station or police officers in the police station can be sent out to an accident site.

When the processing illustrated in FIG. 8, for example, is performed, the information processing system 1000 is capable of sending out paramedics, police officers, or the like to an accident site more reliably.

[5-2] Second Example of Processing in Information Processing System 1000

Figure 9:
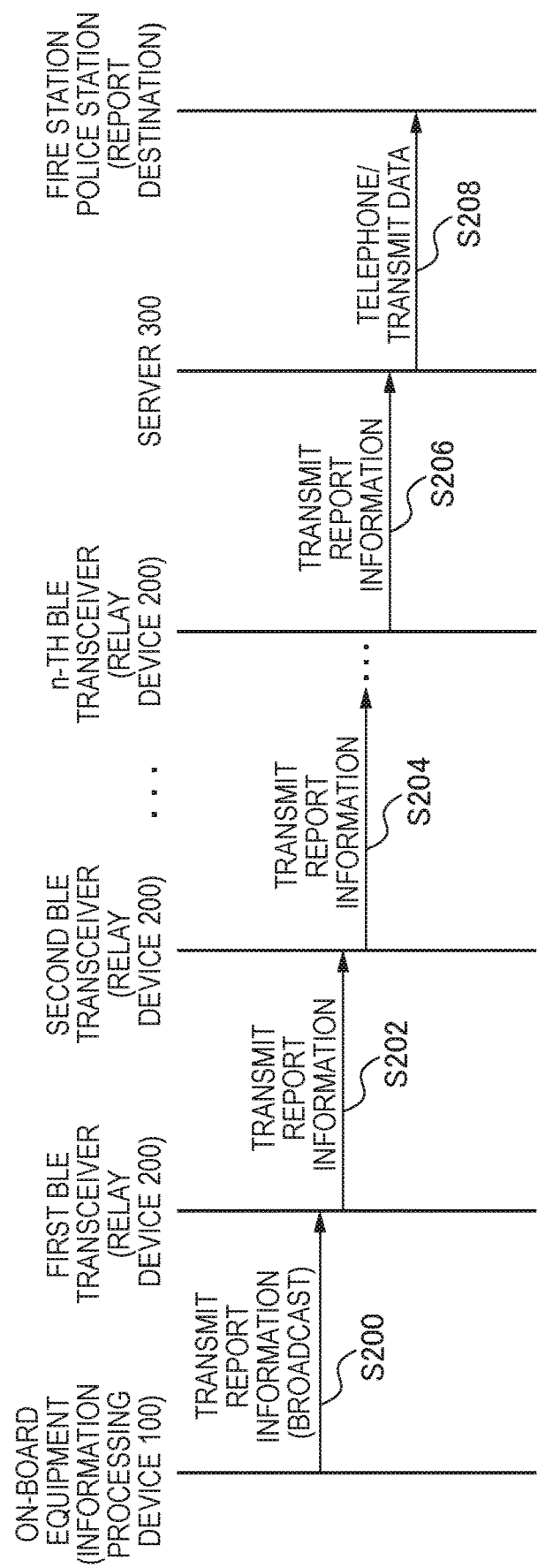
FIG. 9 is an explanatory diagram for describing a second example of processing in the information processing system according to the present embodiment.

FIG. 9 is an explanatory diagram for describing a second example of processing in the information processing system 1000 according to the present embodiment. FIG. 9 illustrates an example of processing in the information processing system 1000 in a case in which a report via a plurality of BLE transceivers (an example of the relay device 200; the same shall apply hereinafter) illustrated in FIG. 7 is realized. That is, FIG. 9 illustrates an example of processing in the information processing system 1000 in which the plurality of relay devices 200 transfers report information and the like in a relay format.

Note that FIG. 9 illustrates an example in which report information and the like are transferred in a relay format by three or more BLE transceivers, whilst in the information processing system 1000, report information and the like may be transferred in a relay format by two BLE transceivers. Further, in a case in which the relay device 200 is a BLE transceiver, it will be appreciated that the example in which report information and the like are transferred in a relay format is not a limitation.

On-board equipment transmits report information for reporting that an accident has occurred in a vehicle on which the on-board equipment is mounted by broadcasting, similarly to step S100 illustrated in FIG. 8 (S200). Further, the on-board equipment may transmit user information by broadcasting together with the report information.

The first BLE transceiver having received the report information transmitted from the on-board equipment in step S200 transmits the received report information (S202). Further, in a case in which report information and user information are received, the first BLE transceiver transmits the received report information and user information. Here, the first BLE transceiver may transmit the received information by broadcasting, or may transmit the received information to a predetermined device having been set in advance.

The second BLE transceiver having received the report information transmitted from the first BLE transceiver in step S202 transmits the received report information (S204). Further, in a case in which report information and user information are received, the second BLE transceiver transmits the received report information and user information. Here, the second BLE transceiver may transmit the received information by broadcasting, or may transmit the received information to a predetermined device having been set in advance.

The information transmitted in step S204 is transferred by being subjected to processing similar to that in the above-described first BLE transceiver and the above-described second BLE transceiver in the BLE transceiver having received the information.

The n-th (n is an integer greater than or equal to 3) BLE transceiver having received report information transmitted from another BLE transceiver transmits the received report information (S206). Further, in a case in which report information and user information are received, the n-th BLE transceiver transmits the received report information and user information. Here, the n-th BLE transceiver may transmit the received information by broadcasting, or may transmit the received information to a predetermined device having been set in advance.

The server 300 having received the report information transmitted from the n-th BLE transceiver in step S206 makes a notification by voice through use of a telephone, a notification by transmitting data through use of e-mail, or the like to a set notification target such as a fire station or a police station (S208), similarly to step S104 in FIG. 8, for example.

Further, in a case in which report information and user information are received, the server 300 processes the report information and the user information to make a notification to the set notification target such as a fire station or a police station, similarly to step S104 in FIG. 8. At this time, in a case in which the received user information has been encrypted, the server 300 decrypts the received user information, and processes the user information similarly to step S104 in FIG. 8.

When the server 300 performs the processing in step S208 to notify a fire station or a police station of an accident, paramedics in the fire station or police officers in the police station can be sent out to an accident site.

When the processing illustrated in FIG. 9, for example, is performed, the information processing system 1000 is capable of sending out paramedics, police officers, or the like to an accident site more reliably.

Further, when a plurality of BLE transceivers transfers report information and the like in a relay format as illustrated in FIG. 9, it is possible to cause the server 300 to receive the report information and the like transmitted from the on-board equipment more reliably.

(Programs According to the Present Embodiment)

[I] Program for Functioning as First Information Processing Device

When a program (for example, a program that can execute processing according to the information processing method according to the present embodiment in the information processing device 100 included in the information processing system 1000) for causing a computer system to function as the first information processing device according to the present embodiment is executed by a processor or the like in the computer system, an information processing system that can reduce the occurrence of a situation in which a report is not made is realized. Here, as the computer system according to the present embodiment, a single computer or a plurality of computers can be used. A series of processing according to the information processing method according to the present embodiment in the first information processing device is performed by the computer system according to the present embodiment.

Further, when the program for causing a computer system to function as the first information processing device according to the present embodiment is executed by a processor or the like in the computer system, effects exerted by the processing in the information processing device 100 (first information processing device) described above can be exerted.

[II] Program for Functioning as Second Information Processing Device

When a program (for example, a program that can execute processing according to the information processing method according to the present embodiment in the server 300 included in the information processing system 1000) for causing a computer system to function as the second information processing device according to the present embodiment is executed by a processor or the like in the computer system, an information processing system that can reduce the occurrence of a situation in which a report is not made is realized. A series of processing according to the information processing method according to the present embodiment in the second information processing device is performed by the computer system according to the present embodiment.

Further, when the program for causing a computer system to function as the second information processing device according to the present embodiment is executed by a processor or the like in the computer system, effects exerted by the processing in the server 300 (second information processing device) described above can be exerted.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the foregoing indicates that a program (computer program) for causing a computer system to function as the first information processing device according to the present embodiment or the second information processing device according to the present embodiment is provided, whilst the present embodiment can also provide together recording mediums in which the above-described programs are respectively stored or a recording medium in which the above-described programs are both stored.

The above-described configuration indicates an example of the present embodiment, and it naturally belongs to the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a processing unit configured to determine whether to make a report on the basis of a detection result of a sensor, and cause report information indicating report contents to be transmitted by broadcasting on the basis of a determination result.

(2)

The information processing device according to (1), in which the processing unit causes the report information to be transmitted in a case in which it is determined that a report is to be made, and does not cause the report information to be transmitted in a case in which it is not determined that a report is to be made.

(3)

The information processing device according to (1) or (2), in which the processing unit causes the report information and user information to be transmitted by broadcasting on the basis of the determination result.

(4)

The information processing device according to (3), in which the user information is information indicating contents related to a user.

(5)

The information processing device according to (3), in which the user information is information indicating an identifier of a user.

(6)

The information processing device according to any one of (3) to (5), in which the processing unit causes the user information having been encrypted to be transmitted.

(7)

The information processing device according to any one of (1) to (6), in which a position of a detection target of the sensor is included in the report contents indicated by the report information.

(8)

The information processing device according to (7), in which one or both of the detection result of the sensor and a state of the detection target are further included in the report contents indicated by the report information.

(9)

The information processing device according to (8), in which the processing unit specifies the state of the detection target on the basis of the detection result of the sensor, and causes the report information including the specified state of the detection target as the report contents to be transmitted.

(10)

The information processing device according to any one of (1) to (9), in which a communication scheme for communication in which the report information is transmitted is a communication scheme in conformity with an IEEE 802.15.1 standard.

(11)

A program for causing a computer to realize functions of:

determining whether to make a report on the basis of a detection result of a sensor; and causing report information indicating report contents to be transmitted by broadcasting on the basis of a determination result.

(12)

An information processing system including:

a first information processing device including a processing unit configured to determine whether to make a report on the basis of a detection result of a sensor, and cause report information indicating report contents to be transmitted by broadcasting on the basis of a determination result;

one or two or more relay devices configured to, in a case in which the report information is received, transmit the report information having been received to an external device; and a second information processing device configured to, in a case in which the report information is received, process the report information.

REFERENCE SIGNS LIST

100 information processing device
102 communication unit
104 control unit
110 processing unit
200, 200A, 200B relay device
300 server
1000 information processing system

The invention claimed is:

1. An information processing device, comprising:
    a processing unit that:
    compares a value indicated by a detection result of a sensor, that detects a state of a detection target, with a threshold value;
    determines report information is to be transmitted, wherein the determination is based on the comparison; and
    controls, based on a result of the determination, transmission of the report information and user information indicating contents related to the detection target with security level information by a broadcasting process to a server via a user communication device and a set of relay devices,
    wherein the user communication device is associated with the detection target of the sensor,
    the user communication device serves as a relay device between the information processing device and the server on a first relay path,
    the set of relay devices constitute a second relay path between the information processing device and the server,
    the report information includes the detection result of the sensor, and
    the report information and the user information are each associated with a security level defined by the security level information,
    wherein the security level of the report information allows access to the report information by the set of relay devices, and the security level of the user information restricts access to the user information by the set of relay devices.

2. The information processing device according to claim 1, wherein the processing unit
    determines the report information is to be transmitted based on a comparison of time-based changes in the value indicated by the detection result of the sensor with a set time-based changing pattern; and
    controls the transmission of the report information based on the determination.

3. The information processing device according to claim 1, wherein the user information indicates an identifier of the detection target.

4. The information processing device according to claim 1, wherein the processing unit
    encrypts the user information; and
    controls the transmission of the encrypted user information.

5. The information processing device according to claim 1, wherein the report information further includes a position of the detection target of the sensor.

6. The information processing device according to claim 5, wherein the report information further includes at least one of the detection result of the sensor or the state of the detection target.

7. The information processing device according to claim 6, wherein the processing unit
- specifies the state of the detection target based on the detection result of the sensor; and
- controls the transmission of the report information including the specified state of the detection target.

8. The information processing device according to claim 1, wherein
- the processing unit controls the transmission based on a communication scheme, and
- the communication scheme is in conformity with an IEEE 802.15.1 standard.

9. The information processing device according to claim 1, wherein the detection target is one of a moving body or a living body.

10. A non-transitory computer-readable medium having stored thereon, computer-executable instructions which, when executed by a computer of an information processing device, cause the computer to execute operations, the operations comprising:
- comparing a value indicated by a detection result of a sensor, that detects a state of a detection target, with a set threshold value;
- determining report information is to be transmitted, wherein the determination is based on the comparison; and
- controlling, based on a result of the determination, transmission of the report information and user information indicating contents related to the detection target with security level information by a broadcasting process to a server via a user communication device and a set of relay devices,
- wherein the user communication device is associated with the detection target of the sensor,
- the user communication device serves as a relay device between the information processing device and the server on a first relay path,
- the set of relay devices constitute a second relay path between the information processing device and the server,
- the report information includes the detection result of the sensor, and
- the report information and the user information are each associated with a security level defined by the security level information, wherein the security level of the report information allows access to the report information by the set of relay devices, and the security level of the user information restricts access to the user information by the set of relay devices.

11. An information processing system, comprising:
a first information processing device that comprises:
a processing unit to:
- compare a value indicated by a detection result of a sensor, that detects a state of a detection target, with a set threshold value;
- determine report information is to be transmitted, wherein the determination is based on the comparison; and
- control, based on a result of the determination, transmission of the report information and user information indicating contents related to the detection target with security level information by a broadcasting process via a user communication device and a set of relay devices,
wherein the user communication device is associated with the detection target of the sensor,
the user communication device serves as a relay device between the first information processing device and a second information processing device on a first relay path,
the set of relay devices constitute a second relay path between the first information processing device and the second information processing device,
the report information includes the detection result of the sensor, and
the report information and the user information are each associated with a security level defined by the security level information, wherein the security level of the report information allows access to the report information by the set of relay devices, and that the security level of the user information restricts access to the user information by the set of relay devices;
the set of relay devices in a case the report information and the user information are received, transmit the report information and the user information to an external device; and
the second information processing device in a case the report information and the user information are received, process the report information and the user information.

* * * * *